US012656746B2

(12) United States Patent
Moriya et al.

(10) Patent No.: US 12,656,746 B2
(45) Date of Patent: Jun. 16, 2026

(54) MANAGEMENT APPARATUS, PREDICTION METHOD, AND PREDICTION PROGRAM

(71) Applicant: Tokyo Electron Limited, Tokyo (JP)

(72) Inventors: Tsuyoshi Moriya, Tokyo (JP); Hironori Moki, Miyagi (JP); Yuki Kataoka, Hokkaido (JP); Kazuya Uoyama, Hokkaido (JP); Takahito Matsuzawa, Hokkaido (JP)

(73) Assignee: Tokyo Electron Limited, Tokyo (JP)

( * ) Notice: Subject to any disclaimer, the term of this patent is extended or adjusted under 35 U.S.C. 154(b) by 332 days.

(21) Appl. No.: 18/258,644

(22) PCT Filed: Dec. 14, 2021

(86) PCT No.: PCT/JP2021/046130
§ 371 (c)(1),
(2) Date: Jun. 21, 2023

(87) PCT Pub. No.: WO2022/145222
PCT Pub. Date: Jul. 7, 2022

(65) Prior Publication Data
US 2024/0045388 A1      Feb. 8, 2024

(30) Foreign Application Priority Data
Dec. 28, 2020      (JP) ................................. 2020-218532

(51) Int. Cl.
G05B 13/00        (2006.01)
G05B 13/02        (2006.01)
G05B 13/04        (2006.01)
(52) U.S. Cl.
CPC ....... *G05B 13/048* (2013.01); *G05B 13/0265* (2013.01)

(58) Field of Classification Search
CPC .. G05B 13/048; G05B 13/0265; G05B 13/02; G05B 13/04; G05B 23/02
See application file for complete search history.

(56) References Cited

U.S. PATENT DOCUMENTS

2018/0046154 A1 * 2/2018 Kondo ................... G05B 17/02
2020/0183338 A1 * 6/2020 Tange ................... G06N 3/088

FOREIGN PATENT DOCUMENTS

JP      2002-157003      5/2002
JP      2016/151744      9/2016
(Continued)

*Primary Examiner* — Julio C. Gonzalez
(74) *Attorney, Agent, or Firm* — IPUSA, PLLC

(57) ABSTRACT

A mechanism of predicting a change in process values with respect to a control target and using a prediction result is provided. A management apparatus includes a prediction model unit, with respect to which an input-output relationship between multivariate control values at a time T with respect to a control target and multivariate process values at a time T+ΔT with respect to the control target has been learned; and an optimization model unit configured to seek multivariate control values of the time T that minimize respective differences between the multivariate process values at the time T+ΔT output from the prediction model unit and corresponding target values, and control the control target using the multivariate control values of the time T that have been sought. The prediction model unit is configured to, in response to a request from an agent, predict multivariate process values of a time after an elapse of a time ΔT with respect to the control target in a case where the control target is controlled with designated control values, and output the multivariate process values that have been predicted to the agent, the agent managing the prediction model unit.

6 Claims, 10 Drawing Sheets

(56) References Cited

FOREIGN PATENT DOCUMENTS

| JP | 2018-092511 | 6/2018 |
| JP | 2020-95352 | 6/2020 |
| JP | 2020-518079 | 6/2020 |
| WO | 2020/050072 | 3/2020 |

* cited by examiner

100

LEARNING PROCESS (CYBERSPACE)

CONTROL PROCESS/ SIMULATION PROCESS (CYBERSPACE)

SUBSTRATE MANUFACTURING PROCESS (PHYSICAL SPACE)

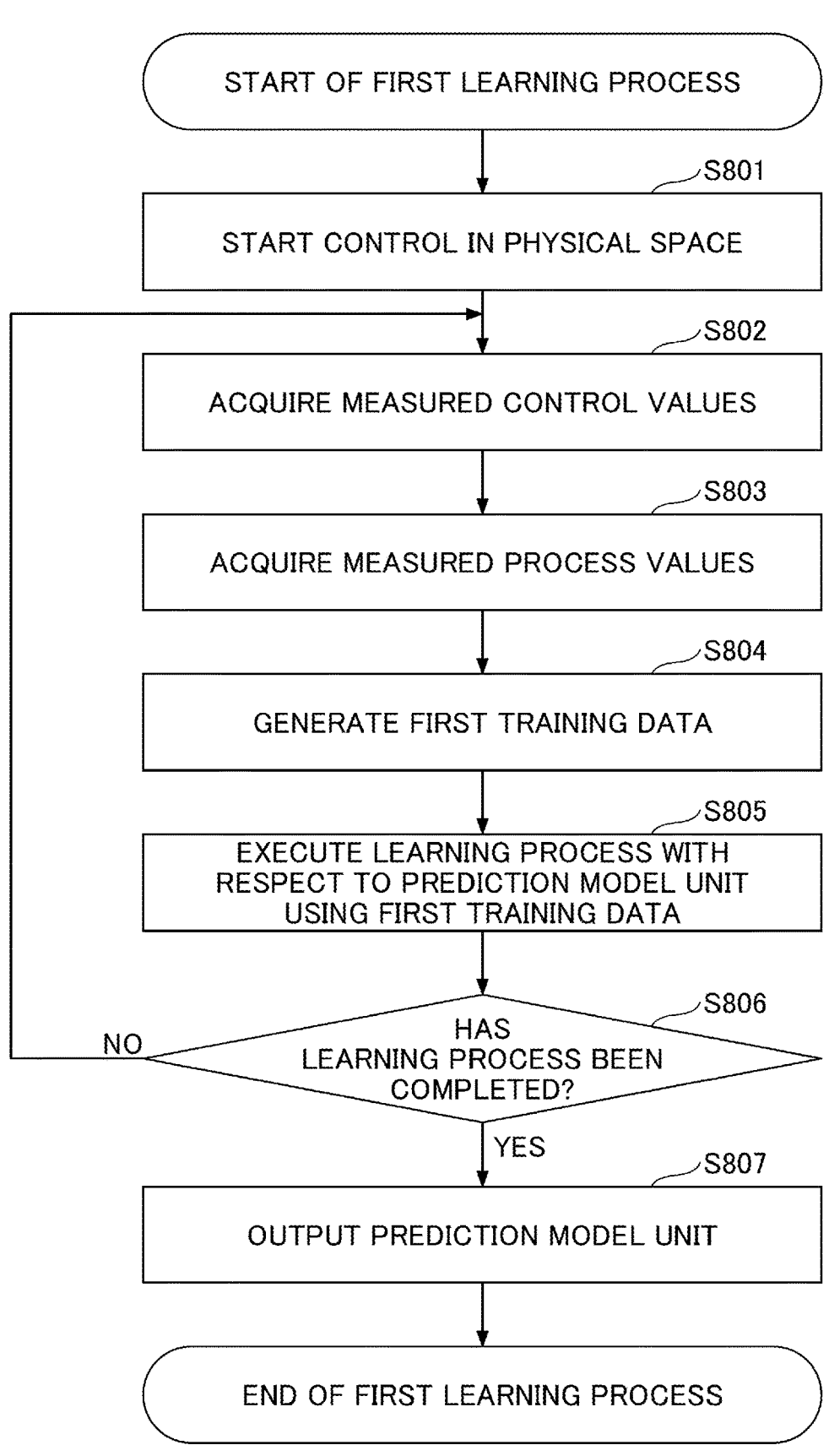

START OF FIRST LEARNING PROCESS

S801

START CONTROL IN PHYSICAL SPACE

S802

ACQUIRE MEASURED CONTROL VALUES

S803

ACQUIRE MEASURED PROCESS VALUES

S804

GENERATE FIRST TRAINING DATA

S805

EXECUTE LEARNING PROCESS WITH RESPECT TO PREDICTION MODEL UNIT USING FIRST TRAINING DATA

S806

HAS LEARNING PROCESS BEEN COMPLETED?

NO

YES

S807

OUTPUT PREDICTION MODEL UNIT

END OF FIRST LEARNING PROCESS

FIG.10

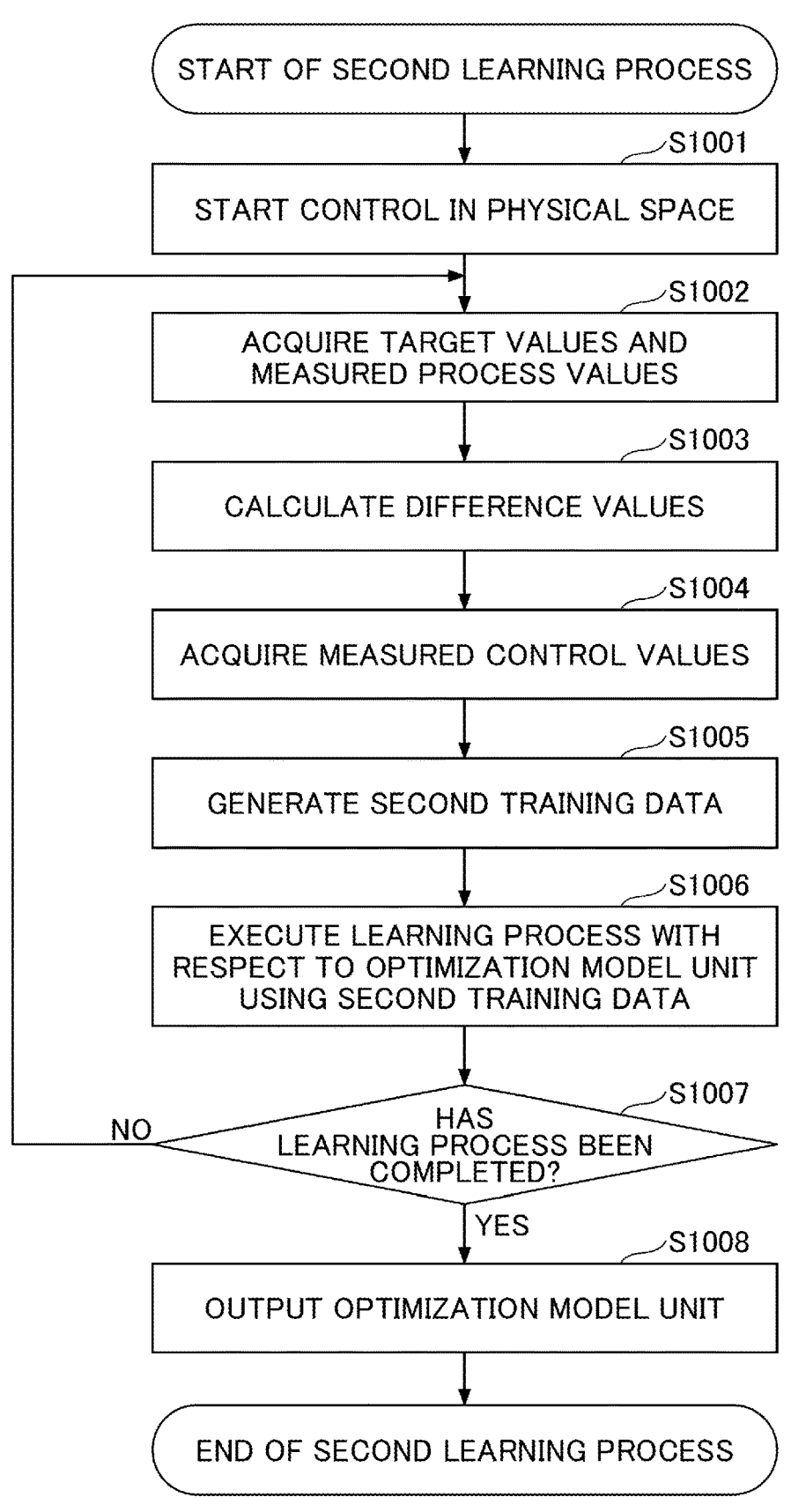

START OF SECOND LEARNING PROCESS

S1001

START CONTROL IN PHYSICAL SPACE

S1002

ACQUIRE TARGET VALUES AND MEASURED PROCESS VALUES

S1003

CALCULATE DIFFERENCE VALUES

S1004

ACQUIRE MEASURED CONTROL VALUES

S1005

GENERATE SECOND TRAINING DATA

S1006

EXECUTE LEARNING PROCESS WITH RESPECT TO OPTIMIZATION MODEL UNIT USING SECOND TRAINING DATA

S1007

HAS LEARNING PROCESS BEEN COMPLETED?

NO

YES

S1008

OUTPUT OPTIMIZATION MODEL UNIT

END OF SECOND LEARNING PROCESS

MANAGEMENT APPARATUS, PREDICTION METHOD, AND PREDICTION PROGRAM

TECHNICAL FIELD

The present disclosure relates to a management apparatus, a prediction method, and a prediction program.

BACKGROUND ART

In recent years, in the technical field of substrate manufacturing processes, various efforts have been made to realize a Smart Factory. To be more specific, development of Digital Twin technology in which a management apparatus collects various data (data in a physical space) measured in a substrate manufacturing process and renders the physical space in a cyberspace is in progress.

When rendering the physical space, for example, models (cyberspace) rendering control targets (physical space) in various substrate processing apparatuses executing substrate manufacturing processes are required to accurately predict changes in process values with respect to the control targets. In addition, it is required to build a mechanism for effectively using the process values predicted by the models.

PRIOR ART DOCUMENT

Patent Document

Patent Document 1: International Publication No. 2020/050072

Patent Document 2: Japanese Unexamined Patent Application Publication No. 2020-518079

Patent Document 3: Japanese Unexamined Patent Application Publication No. 2018-092511

SUMMARY OF THE INVENTION

Problem to be Solved by the Invention

The present disclosure provides a mechanism of predicting changes in process values with respect to a control target and using the prediction result.

Means for Solving the Problem

A management apparatus according to an aspect of the present disclosure includes, for example:

a prediction model unit, with respect to which an input-and-output relationship between multivariate control values at a time T with respect to a control target and multivariate process values at a time T+ΔT with respect to the control target has been learned;

an optimization model unit configured to seek multivariate control values at the time T that minimize respective differences between the multivariate process values at the time T+ΔT output from the prediction model unit and corresponding target values, and control the control target by using the multivariate control values at the time T that have been sought.

The prediction model unit is configured to, in response to a request from an agent managing the prediction model unit, predict multivariate process values after an elapse of a time ΔT with respect to the control target when the control target is controlled with designated control values, and output the multivariate process values that have been predicted to the agent.

Advantageous Effects of the Invention

According to the present disclosure, it is possible to provide a mechanism of predicting changes in process values with respect to a control target and using the prediction result.

BRIEF DESCRIPTION OF THE DRAWINGS

FIG. 8 is an example of a flowchart depicting a flow of a first learning process.

FIG. 10 is an example of a flowchart depicting a flow of a second learning process.

MODE FOR CARRYING OUT THE INVENTION

Figure 1:
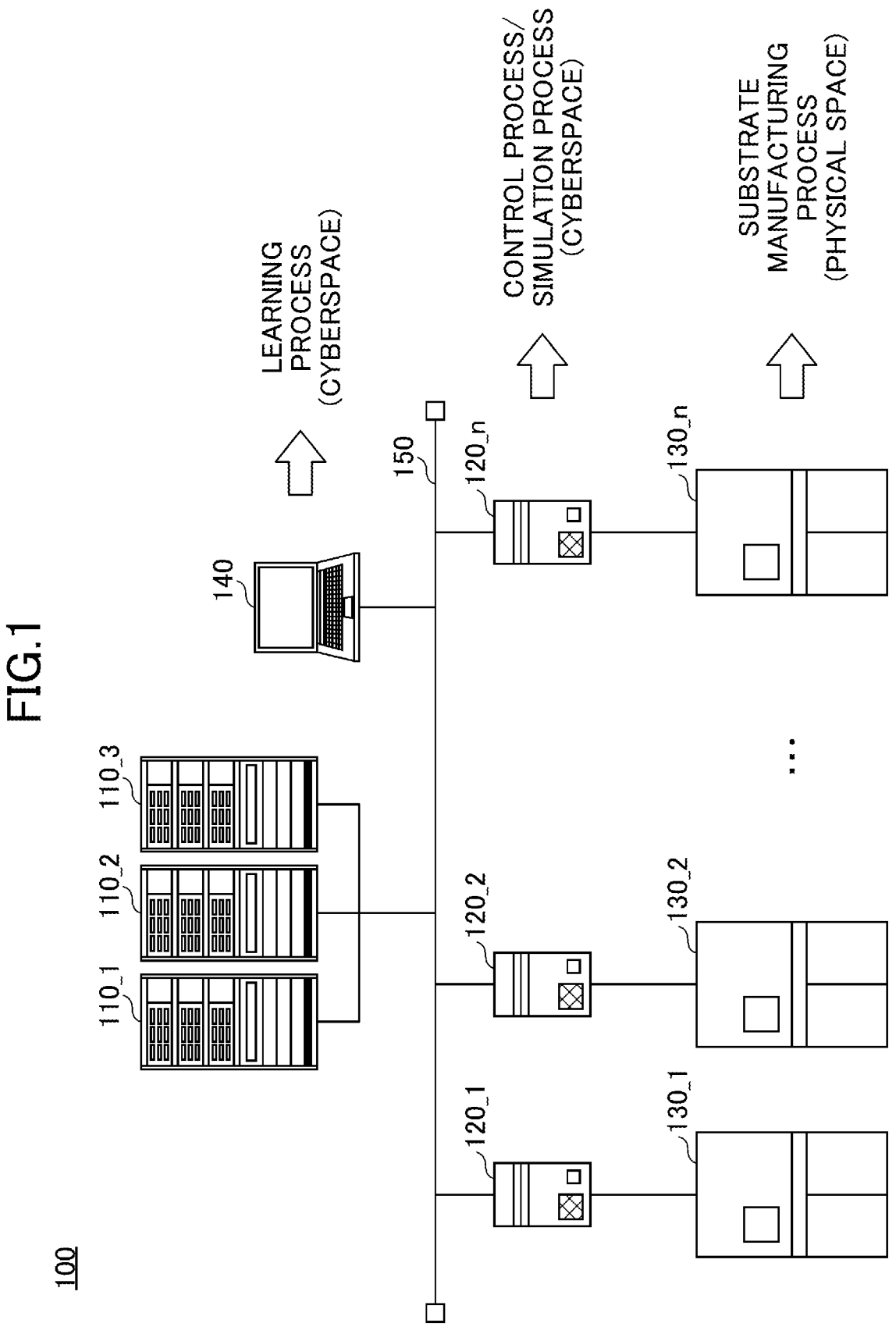
FIG. 1 is a diagram depicting an example of a system configuration of a cyber-physical system including a plurality of substrate processing apparatuses for executing substrate manufacturing processes.

Hereinafter, embodiments will be described with reference to the accompanying drawings. In the specification and the drawings, components having substantially the same functional configurations are denoted by the same reference numerals, and redundant description thereof will be omitted.

First Embodiment

<System Configuration of Cyber-Physical System>

First, a system configuration of a cyber-physical system including a plurality of substrate processing apparatuses that execute substrate manufacturing processes will be described. FIG. 1 is a diagram illustrating an example of a system configuration of a cyber-physical system including a plurality of substrate processing apparatuses that execute substrate manufacturing processes.

As illustrated in FIG. 1, the cyber-physical system 100 includes server apparatuses 110_1 to 110_3, management apparatuses 120_1 to 120_n, substrate processing apparatuses 130_1 to 130_n, and an administrator terminal 140.

In the cyber-physical system 100, the server apparatuses 110_1 to 110_3, the management apparatuses 120_1 to 120_n, and the administrator terminal 140 are communicably connected via a network 150.

The server apparatuses 110_1 to 110_3 are apparatuses that control the entire cyber-physical system 100. The server apparatuses 110_1 to 110_3 perform, for example, manufacturing management, data management, and apparatus management with respect to substrate manufacturing processes executed by the substrate processing apparatuses 130_1 to 130_n, and management of models used in the cyberspace by the management apparatuses 120_1 to 120_n.

The management apparatuses 120_1 to 120_n are connected to the substrate processing apparatuses 130_1 to 130_n, respectively, and constitute a management system.

In addition, the management apparatuses 120_1 to 120_n have various models rendering respective control targets in the corresponding substrate processing apparatuses 130_1 to 130_n, and create a cyberspace. The management apparatuses 120_1 to 120_n execute control processes on respective control targets using control values calculated using the various models.

Specifically, the management apparatuses 120_1 to 120_n calculate control values that minimize difference values between process values predicted by the various models and target values, and control the control targets. That is, the management apparatuses 120_1 to 120_n can control the control targets by predicting changes in the process values.

Further, the management apparatuses 120_1 to 120_n collect data in a physical space acquired in the substrate processing apparatuses 130_1 to 130_n, to:

determine states of the substrate processing apparatuses 130_1 to 130_n;

detect events occurring in the substrate processing apparatuses 130_1 to 130_n; and the like, to appropriately respond to the various events occurring in the physical space.

The management apparatuses 120_1 to 120_n execute simulation processes using the various models in the cyberspace to appropriately respond to the various events occurring in the physical space. Thus, for example, the management apparatuses 120_1 to 120_n can predict how the process values with respect to the control targets (physical space) will change during an elapse of a time ΔT in response to the control values being changed at a time T.

That is, the management apparatuses 120_1 to 120_n can appropriately respond to the events by determining the changes in the process values with respect to the control targets (physical space) occurring during the time ΔT.

The substrate processing apparatuses 130_1 to 130_n are apparatuses that execute substrate manufacturing processes and constitute a physical space. The substrate processing apparatuses 130_1 to 130_n include, for example, an apparatus of performing a film forming process, an apparatus of performing a lithography process, an apparatus of performing an etching process, an apparatus of performing a cleaning process, and the like.

The substrate processing apparatuses 130_1 to 130_n include a plurality of control targets, and the respective control targets are controlled based on control values calculated by the management apparatuses 120_1 to 120_n. The substrate processing apparatuses 130_1 to 130_n transmit data in the physical space acquired during execution of the substrate manufacturing processes to the management apparatuses 120_1 to 120_n.

The administrator terminal 140 is a terminal operated by an administrator who manages the cyber-physical system 100. For example, the administrator terminal 140 generates the various models used in the management apparatuses 120_1 to 120_n. Specifically, the administrator terminal 140 first acquires measured process values and measured control values with respect to control targets among data in the physical space collected by the management apparatuses 120_1 to 120_n, and generates training data. Then, the administrator terminal 140 generates the various models by performing learning processes using the generated training data.

With regard to the cyber-physical system 100 depicted in FIG. 1, a case where the management apparatuses 120_1 to 120_n and the substrate processing apparatuses 130_1 to 130_n are configured to be respective separate bodies has been described. However, the management apparatuses 120_1 to 120_n and the substrate processing apparatuses 130_1 to 130_n may be configured to be a single body as a whole.

<Hardware Configuration of Management Apparatuses and Administrator Terminal>

Figure 2:
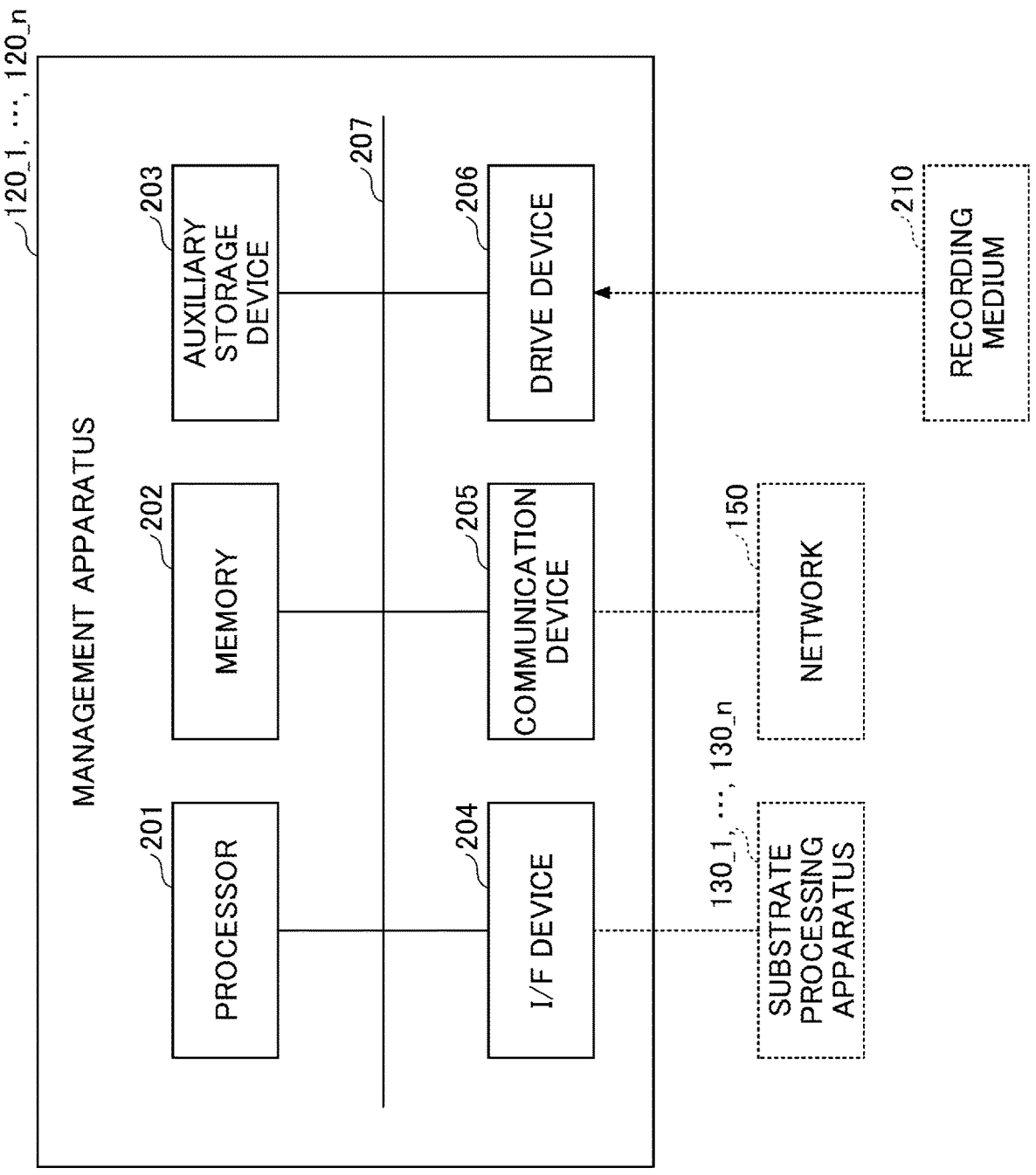
FIG. 2 is a diagram illustrating an example of a hardware configuration of a management apparatus.

Next, hardware configurations of the management apparatuses 120_1 to 120_n and the administrator terminal 140 will be described. Since the management apparatuses 120_1 to 120_n and the administrator terminal 140 have the same hardware configurations, the management apparatuses 120_1 to 120_n will be generally described with reference to FIG. 2. FIG. 2 is a diagram illustrating an example of a hardware configuration of each of the management apparatuses 120_1 to 120_n.

As illustrated in FIG. 2, each of the management apparatuses 120_1 to 120_n includes a processor 201, a memory 202, an auxiliary storage device 203, an interface (I/F) device 204, a communication device 205, and a drive device 206. The hardware components of each of the management apparatuses 120_1 to 120_n are connected to each other via a bus 207.

The processor 201 includes various arithmetic and logic operation devices such as a central processing unit (CPU) and a graphics processing unit (GPU). The processor 201 reads various programs (for example, a prediction program to be described later) on the memory 202 and executes the programs.

The memory 202 includes a main storage device such as a read-only memory (ROM) and a random access memory (RAM). The processor 201 and the memory 202 form a so-called computer, and the computer implements various functions by the processor 201 executing the various programs read out on the memory 202.

The auxiliary storage device 203 stores the various programs and various types of data used when the various programs are executed by the processor 201.

The I/F device 204 is a connection device that connects the substrate processing apparatuses 130_1 to 130_n, which are examples of external apparatuses, with the management apparatuses 120_1 to 120_n.

The communication device 205 is a communication device for communicating with other apparatuses (in the present embodiment, the server apparatuses 110_1 to 110_3, the other management apparatuses, the administrator terminal 140, and the like) via the network 150.

The drive device 206 is a device for mounting a recording medium 210. Specific examples of the recording medium 210 include media for optically, electrically, and magnetically recording information, such as a CD-ROM, a flexible disk, and a magneto-optical disk. In addition, the specific examples of the recording medium 210 may include a semiconductor memory and the like that electrically record information, such as a ROM and a flash memory.

The various programs installed in the auxiliary storage device 203 are installed by, for example, setting the distributed recording medium 210 in the drive device 206 and reading out the various programs recorded in the recording medium 210 by the drive device 206.

Alternatively, the various programs installed in the auxiliary storage device 203 may be installed by being downloaded from a network via the communication device 205.

<Functional Configuration and Various Processes of Cyber-Physical System>

Next, the functional configuration of the cyber-physical system 100 and the details of various processes executed in the cyber-physical system 100 will be described. As described above, the cyber-physical system 100 has:

a control phase in which the management apparatuses 120_1 to 120_n perform control processes on control targets using various models that render the control targets;

a simulation phase in which the management apparatuses 120_1 to 120_n determine states of the substrate processing apparatuses, and perform simulation processes using various models that render the control targets to appropriately respond to events when the events are detected; and a learning phase in which the administrator terminal 140 generates the various models by generating training data using measured process values, measured control values, and the like with respect to the control targets and performing learning processes using the generated training data.

In each of these phases, corresponding different functions operate. Hereinafter, the functional configuration of the cyber-physical system 100 and the details of the various processes will be described with respect to each phase.

(1) Control Phase (1-1) Functional Configuration

Figure 3:
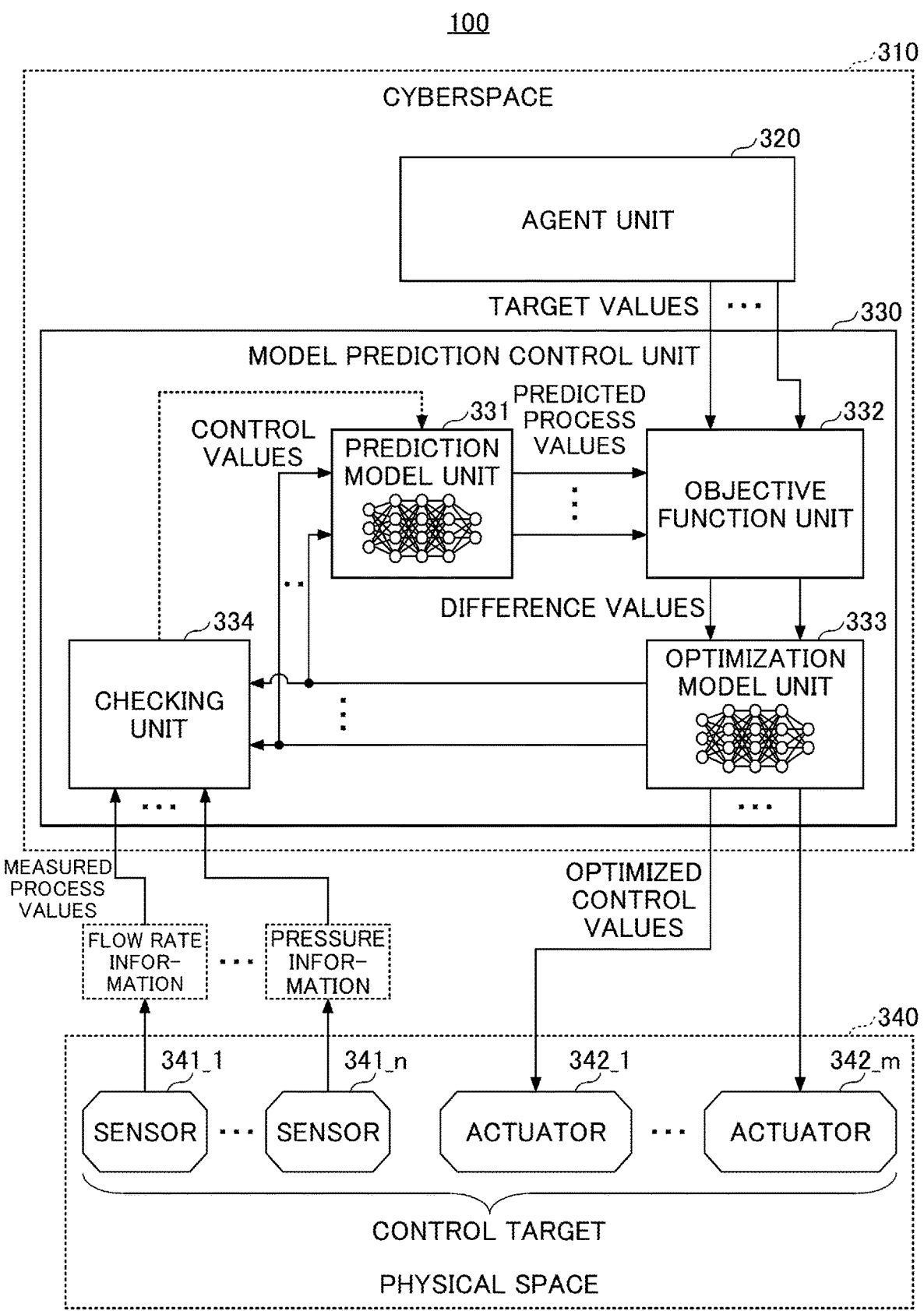
FIG. 3 is a diagram illustrating an example of a functional configuration of the cyber-physical system with respect to a control phase.

First, the functional configuration of the cyber-physical system 100 with respect to the control phase will be described. FIG. 3 is a diagram illustrating an example of the functional configuration of the cyber-physical system with respect to the control phase.

As described above, the prediction programs are installed in the management apparatuses 120_1 to 120_n, respectively. When the management apparatuses 120_1 to 120_n execute the prediction programs, an agent unit 320 and a model prediction control unit 330 are implemented for each management apparatus in the cyberspace 310 with respect to the control phase.

In the control phase, the agent unit 320 sets multivariate target values for the model prediction control unit 330. The target values are target values that are used when the model prediction control units 330 execute control processes with respect to control targets (physical space 340) in the substrate processing apparatuses 130_1 to 130_n. The example of FIG. 3 indicates that a control target (physical space 340) includes sensors 341_1 to 341_n and actuators 342_1 to 342_m.

As illustrated in FIG. 3, with respect to the control target including the sensors 341_1 to 341_n and the actuators 342_1 to 342_m, operations of the plurality of (m) actuators are controlled in such a manner that the multivariate (n) measured process values should match the corresponding multivariate (n) target values. For this purpose, the agent units 320 set multivariate (n) target values for the model prediction control units 330.

The model prediction control unit 330 includes a prediction model unit 331, an objective function unit 332, an optimization model unit 333, and a checking unit 334.

The prediction model unit 331 is acquired by modeling behaviors of the control target (the physical space 340), and is a model acquired as a result of the input-output relationships between multivariate measured control values of the control target at a time T and multivariate measured process values with respect to the control targets at a time T+ΔT being learned.

The objective function unit 332 calculates respective difference values between the multivariate predicted process values of the time T+ΔT output from the prediction model unit 331 and the multivariate target values set by the agent unit 320, and provides the optimization model unit 333 with the difference values.

The optimization model unit 333 seeks multivariate control values of the time T that minimize the respective difference values provided by the objective function unit 332. In addition, the optimization model unit 333 inputs the sought multivariate control values to the prediction model unit 331, and again acquires respective difference values between the multivariate predicted process values of the time T+ΔT output by the prediction model unit 331 and the multivariate target values. Thus, the optimization model unit 333 minimizes the respective difference values by repeating these processes, and calculates optimal multivariate control values of the time T.

In addition, the optimization model unit 333 transmits the optimal multivariate control values of the time T to the actuators 342_1 to 342_m of the control target (physical space 340) (actually, the optimal multivariate control values are transmitted to the corresponding one of the substrate processing apparatuses and are provided to the respective actuators from the corresponding substrate processing apparatus).

Thus, the optimization model unit 333 can control the control target (the physical space 340) by predicting the multivariate predicted process values.

The checking unit 334 acquires the optimal multivariate control values from the optimization model unit 333. In addition, the checking unit 334 acquires the multivariate measured process values from the physical space 340 in response to the optimal multivariate control values being transmitted to the actuators 342_1 and 342_2 of the control target (physical space 340).

Furthermore, the checking unit 334 determines whether or not the control values are appropriate, based on the optimal multivariate control values and the acquired multivariate measured process values, determines the prediction accuracy of the prediction model unit 331, and appropriately adjusts model parameters of the prediction model unit 331. Thus, the checking unit 334 can match the behavior of the prediction model unit 331 with the behavior of the control targets in the physical space 340 (that is, can match the predicted process values with the measured process values).

The physical space 340 constituted by the substrate processing apparatuses 130_1 to 130_n includes a plurality of control targets. The example of FIG. 3 illustrates the one control target, including the sensors 341_1 to 341_n and the actuators 342_1 to 342_m, among the plurality of control targets.

The sensors 341_1 to 341_n measure process values such as flow rate information and pressure information. Flow rate information, pressure information, and the like measured by the sensors 341_1 to 341_n are provided to the cyberspace 310 as the measured process values.

The actuators 342_1 to 342_m operate based on instructions from the cyberspace 310. The example of FIG. 3 illustrates that the actuators 342_1 to 342_m operate based on the respective optimal multivariate control values calculated by the model prediction control unit 330.

(1-2) Control Process

Figure 4:
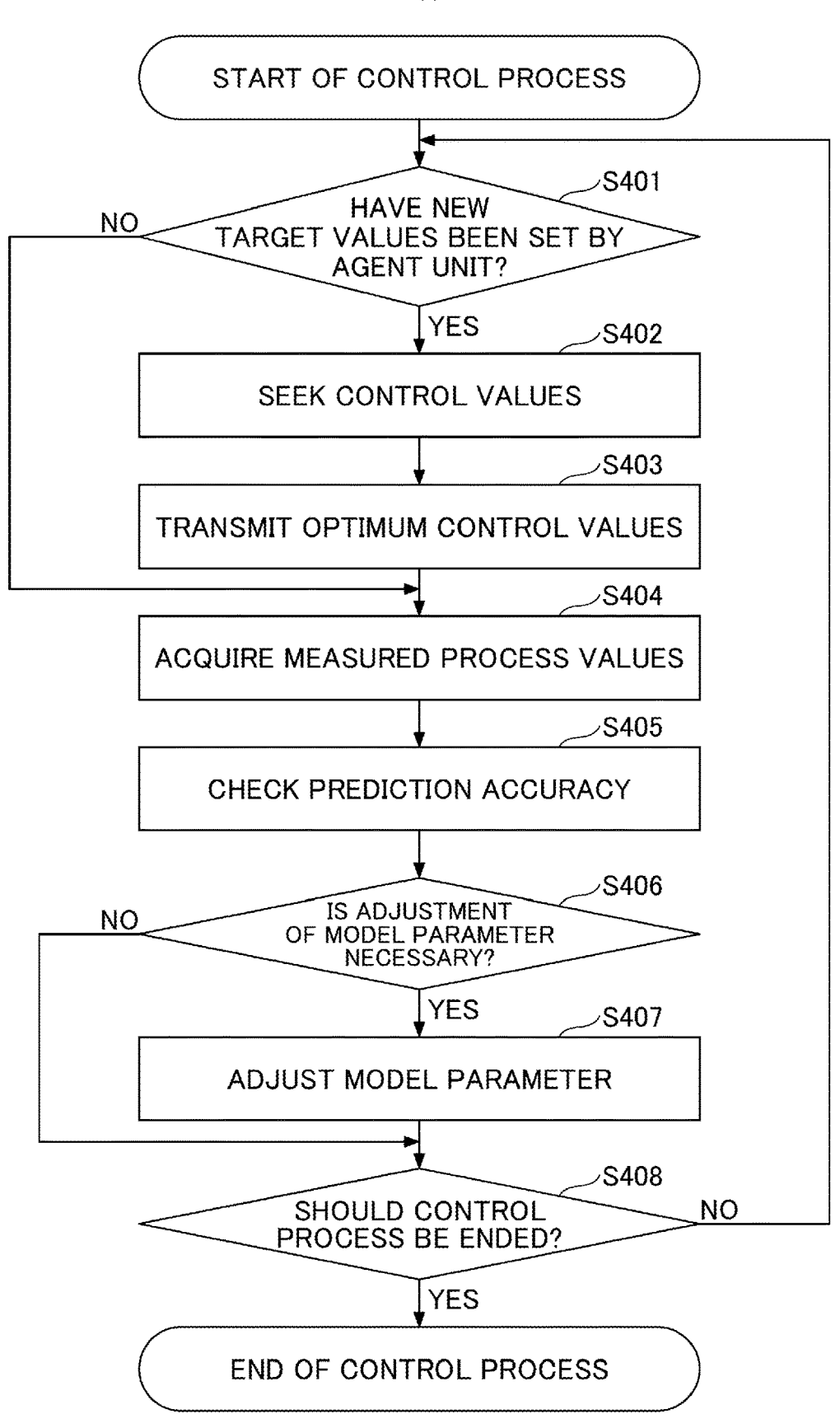
FIG. 4 is an example of a flowchart depicting a flow of a control process.

Next, the flow of the control process executed by the cyber-physical system 100 in the control phase will be described. FIG. 4 is an example of a flowchart illustrating the flow of the control process.

In step S401, the model prediction control unit 330 determines whether or not new multivariate target values have been set by the agent unit 320.

When it is determined in step S401 that new multivariate target values have not been set (NO in step S401), the process proceeds to step S404.

On the other hand, when it is determined in step S401 that new multivariate target values have been set (YES in step S401), the process proceeds to step S402.

In step S402, the model prediction control unit 330 seeks optimal multivariate control values of a time T in such a manner that multivariate predicted process values at the time T+ΔT that minimize the respective difference values from the new multivariate target values can be output from the prediction model unit 331.

In step S403, the model prediction control unit 330 transmits the optimal multivariate control values of the time T acquired by the seeking to the actuators 342_1 and 342_2 of the control target (physical space 340).

In step S404, the model prediction control unit 330 acquires the multivariate measured process values of the time T+ΔT, provided from the physical space 340 in response to the optimal multivariate control values of the time T being transmitted.

In step S405, the model prediction control unit 330 determines the suitability of the control values of the time T and determines the prediction accuracy of the prediction model unit 331 based on the optimal multivariate control values at the time T and the acquired multivariate measured process values at the time T+ΔT.

In step S406, the model prediction control unit 330 determines whether or not it is necessary to adjust the model parameters of the prediction model unit 331.

When it is determined in step S406 that the adjustment of the model parameters is not necessary (NO in step S406), the process proceeds to step S408.

On the other hand, when it is determined in step S406 that the model parameters need to be adjusted (YES in step S406), the process proceeds to step S407.

In step S407, the model prediction control unit 330 adjusts the model parameters of the prediction model unit 331.

In step S408, the model prediction control unit 330 determines whether or not to end the control process.

When it is determined in step S408 that the control process is not to be ended (NO in step S408), the process returns to step S401.

On the other hand, when it is determined in step S409 that the control process is to be ended (YES in step S408), the control process is ended.

(2) Simulation Phase (2-1) Functional Configuration

Figure 5:
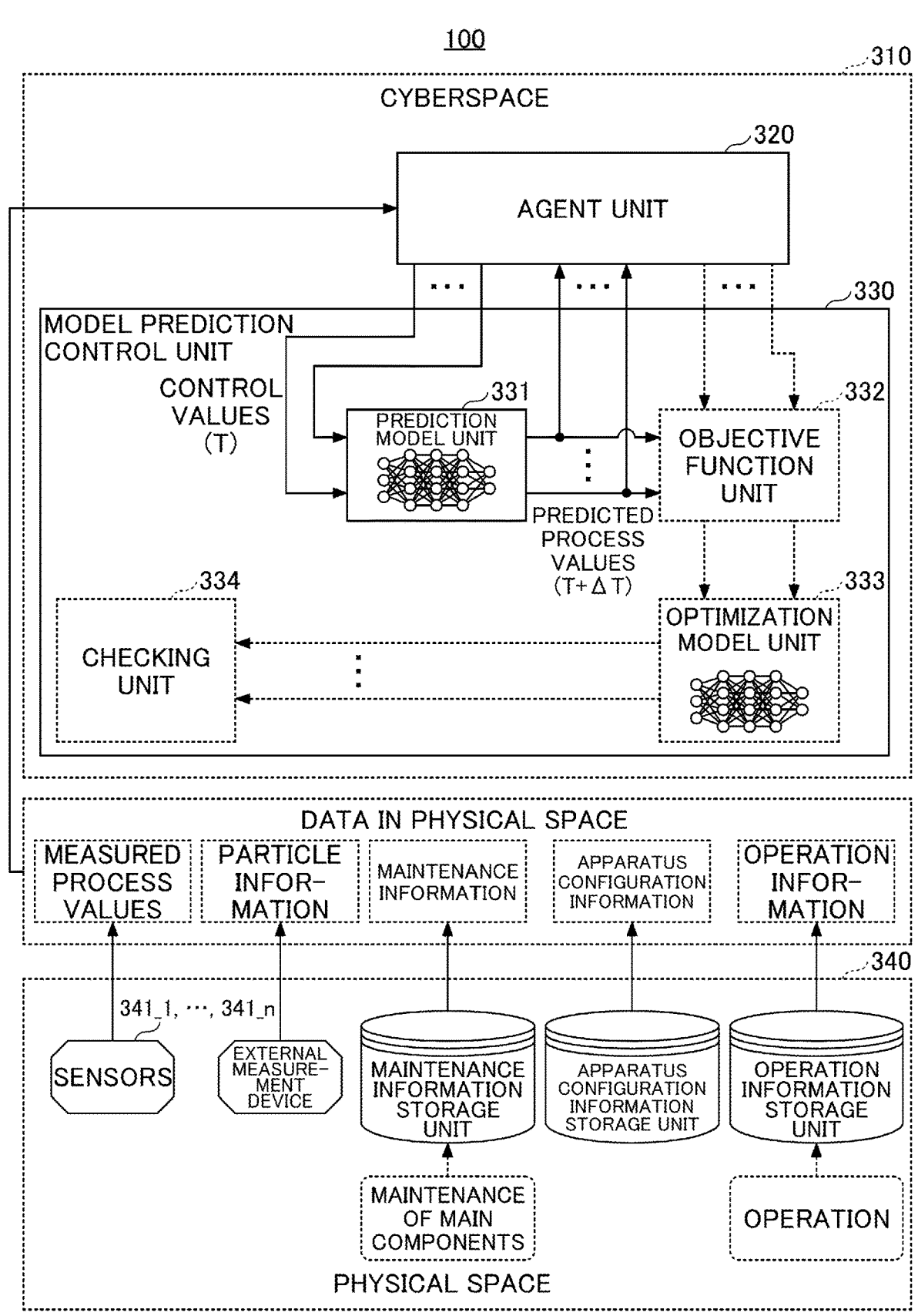
FIG. 5 is a diagram illustrating an example of a functional configuration of the cyber-physical system with respect to a simulation phase.

Next, the functional configuration of the cyber-physical system 100 in the simulation phase will be described. FIG. 5 is a diagram illustrating an example of the functional configuration of the cyber-physical system in the simulation phase.

The difference from the functional configuration of the cyber-physical system 100 in the control phase described with reference to FIG. 3 is the function of the agent unit 320 and the configuration of the physical space 340.

In the simulation phase, the agent units 320 collect data (given data such as particle information, maintenance information, apparatus configuration information, and operation information in addition to measured process values) in the physical space, to:

determine states of the substrate processing apparatuses 130_1 to 130_n;

detect events occurring in the substrate processing apparatuses 130_1 to 130_n;

and the like, to appropriately respond to the various events occurring in the physical space 340. The data in the physical space depicted in FIG. 5 is an example, and may include, for example, information acquired by measuring processed states of substrates instead of (or in addition to) the particle information. In the example of FIG. 5, devices of measuring the particle information are external measurement devices, but the devices of measuring the particle information are not limited to the external measurement devices, and may be internal measurement devices installed in the substrate processing apparatuses 130_1 to 130_n. For example, they may be devices that measure internal states of the substrate processing apparatuses 130_1 to 130_n through windows provided in walls of the substrate processing apparatuses 130_1 to 130_n. In addition, the devices of measuring the particle information may be devices of observing state on the substrates to be processed or devices of acquiring states of processing spaces in which the substrates to be processed are processed.

It is assumed that the agent unit 320 determines that, in response to an event, it is necessary to change the control values to be transmitted to the control target (physical space 340). In this case, the agent unit 320 makes a request to the model prediction control unit 330 to cause the model prediction control unit 330 to execute simulation to predict:

"how the measured process values with respect to the control target (physical space 340) change during a time ΔT in response to the control values transmitted to the control target being changed"

In the example of FIG. 5, the agent unit 320 requests the model prediction control unit 330 to predict predicted process values of time T+ΔT that are acquired in response to the multivariate control values being changed at a time T. Specifically, the agent unit 320 inputs the changed multivariate control values of time T to the prediction model unit 331.

Thus, the agent unit 320 can acquire the predicted process values of the time T+ΔT from the model prediction control unit 330. As a result, the agent unit 320 can appropriately respond to the event by determining the change in the process values with respect to the control target (physical space 340) occurring during the time ΔT in response to control values being changed at the time T.

(2-2) Simulation Process

Figure 6:
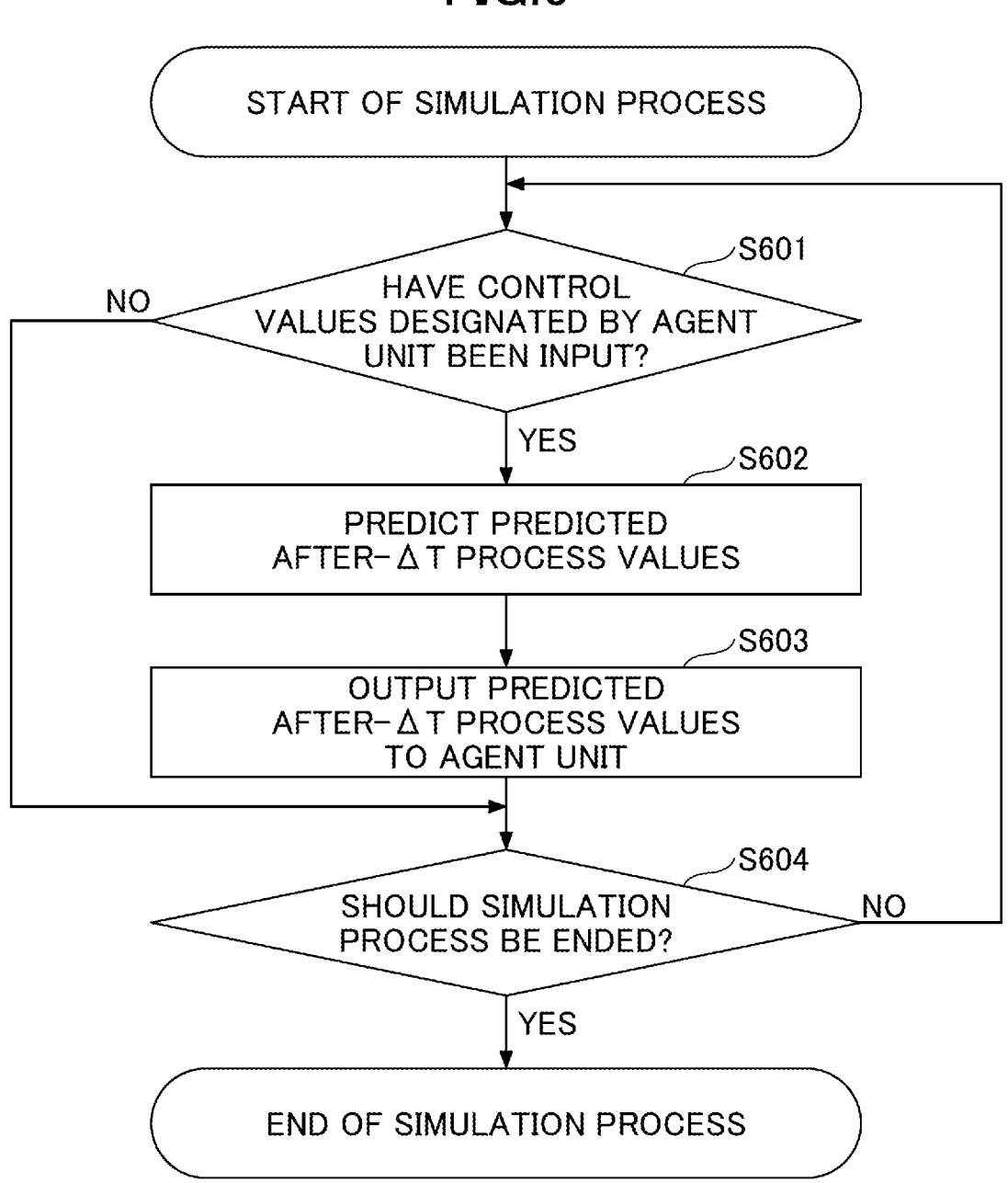
FIG. 6 is an example of a flowchart depicting a flow of a simulation process.

Next, a flow of the simulation process executed by the cyber-physical system 100 in the simulation phase will be described. FIG. 6 is an example of a flowchart illustrating the flow of the simulation process.

In step S601, the model prediction control unit 330 determines whether or not changed multivariate control values designated by the agent unit 320 have been input.

When it is determined in step S601 that the designated changed multivariate control values have not been input (NO in step S601), the process proceeds to step S604.

On the other hand, when it is determined in step S601 that the designated changed multivariate control values have been input (YES in step S601), the process proceeds to step S602.

In step S602, the model prediction control unit 330 predicts predicted process values to be acquired after an elapse of a time ΔT.

In step S603, the model prediction control unit 330 outputs the predicted process values to be acquired after the elapse of the time ΔT to the agent unit 320.

In step S604, the model prediction control unit 330 determines whether or not to end the simulation process. When it is determined in step S604 that the simulation process is not to be ended (NO in step S604), the process returns to step S601.

On the other hand, when it is determined in step S604 that the simulation processing is to be ended (YES in step S604), the simulation process is ended.

(3) Learning Phase (Prediction Model Unit)

(3-1) Functional Configuration

Figure 7:
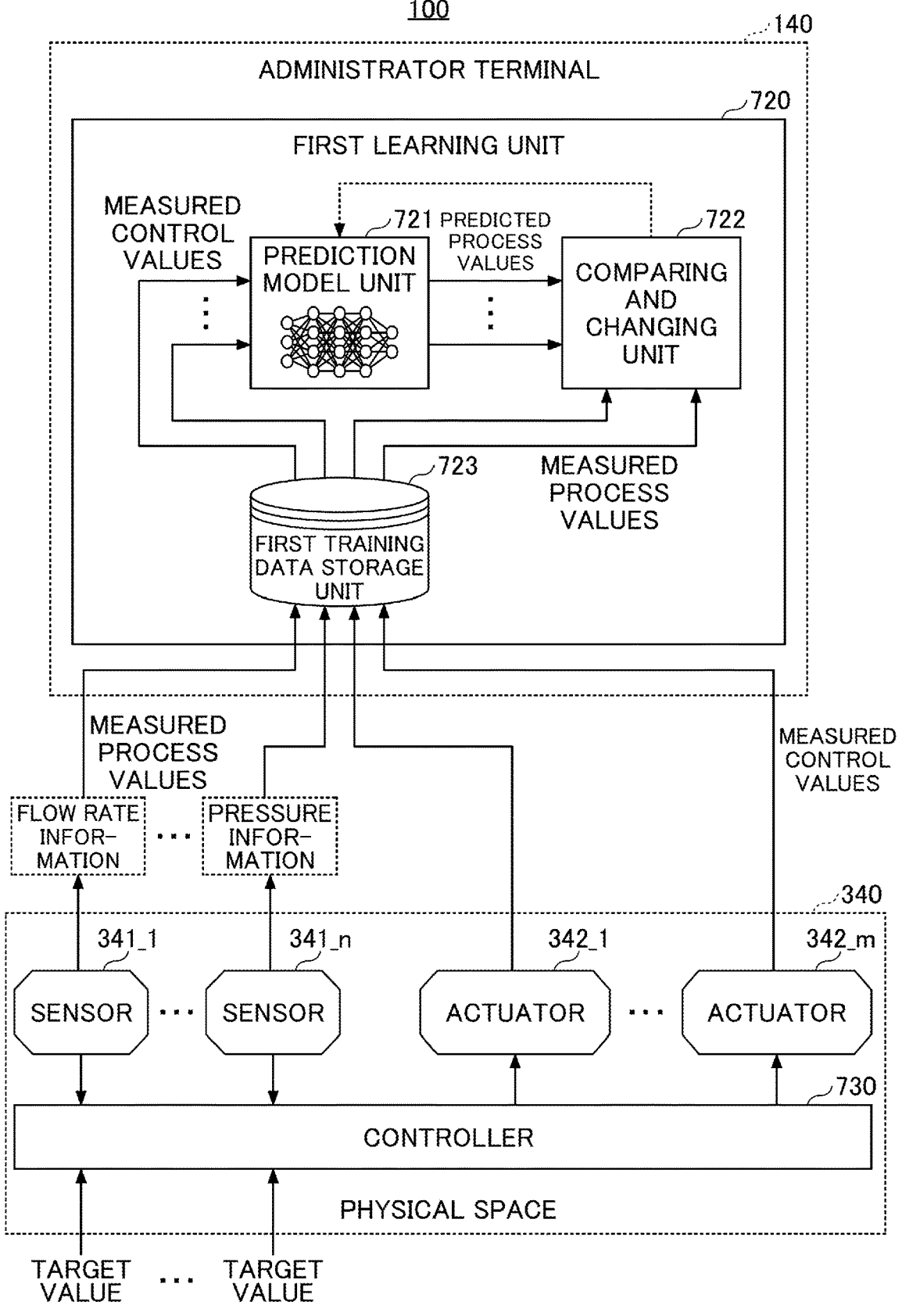
FIG. 7 is a first diagram illustrating an example of a functional configuration of the cyber-physical system with respect to a learning phase.

Next, a functional configuration of the cyber-physical system 100 in the learning phase in which a learning process is performed with respect to the prediction model unit will be described. FIG. 7 is a first diagram illustrating an example of a functional configuration of the cyber-physical system in the learning phase.

A first learning program is installed in the administrator terminal 140, and the administrator terminal 140 functions as a first learning unit 720 by executing the first learning program.

The first learning unit 720 stores first training data in a first training data storage unit 723. Specifically, the first learning unit 720 acquires multivariate measured control values of the time T and multivariate measured process values of the time T+ΔT provided from the physical space 340 via the management apparatuses 120_1 to 120_n (not illustrated in FIG. 7).

The example of FIG. 7 illustrates that, in the physical space 340, the substrate processing apparatuses 130_1 to 130_n include the control targets (sensors 341_1 to 341_n and actuators 342_1 to 342_m) and controllers 730 that control the control targets.

The controller 730 controls the actuators 342_1 to 342_m in such a manner that multivariate measured process values measured by the sensors 341_1 to 341_n approach multivariate target values set in the controller 730.

The first learning unit 720 generates first training data using multivariate measured control values of the current time T and multivariate measured process values of time T+ΔT being acquired in such a manner that the multivariate measured control values of the current time T are associated with the multivariate measured process values of time T+ΔT, and stores the first training data in the first training data storage unit 723.

The first learning unit 720 includes a prediction model unit 721 and a comparing and changing unit 722, and performs a learning process with respect to the prediction model unit 721.

Specifically, the first learning unit 720 reads the first training data from the first training data storage unit 723 and inputs the multivariate measured control values of the time T to the prediction model unit 721. As a result, the prediction model unit 721 outputs multivariate predicted process values of the time T+ΔT.

In addition, the first learning unit 720 inputs the multivariate measured process values of the time T+ΔT to the comparing and changing unit 722 as the ground truth data. Thus, the comparing and changing unit 722 calculates respective errors between the multivariate predicted process values at the time T+ΔT and the multivariate measured process values at the time T+ΔT, and back-propagates these errors, to update model parameters of the prediction model unit 721. As a result, the first learning unit 720 can learn the input-output relationships between the multivariate measured control values at the time T with respect to the control target and the multivariate measured process values at the time T+ΔT with respect to the control target, and can generate the trained prediction model unit 331.

(3-2) First Learning Process

Next, a flow of the first learning process executed by the cyber-physical system 100 in the learning phase will be described. FIG. 8 is an example of a flowchart illustrating the flow of the first learning process.

In step S801, in the physical space 340, the controllers 730 in the substrate processing apparatuses 130_1 to 130_n start control processes on the control targets.

In step S802, the first learning unit 720 of the administrator terminal 140 acquires multivariate measured control values of the time T provided from the physical space 340.

In step S803, the first learning unit 720 of the administrator terminal 140 acquires multivariate measured process values of the time T+ΔT provided from the physical space 340.

In step S804, the first learning unit 720 of the administrator terminal 140 associates the acquired multivariate measured control values of the time T with the acquired multivariate measured process values of the time T+ΔT to generate first training data.

In step S805, the first learning unit 720 of the administrator terminal 140 performs a learning process with respect to the prediction model unit 721 using the generated first training data.

In step S806, the first learning unit 720 of the administrator terminal 140 determines whether or not the learning process with respect to the prediction model unit 721 has been completed. When it is determined in step S806 that the learning process has not been completed (NO in step S806), the process returns to step S802.

On the other hand, when it is determined in step S806 that the learning process has been completed (YES in step S806), the process proceeds to step S807.

In step S807, the first learning unit 720 of the administrator terminal 140 outputs the trained prediction model unit.

(4) Learning Phase (Optimization Model Unit)

(4-1) Functional Configuration

Figure 9:
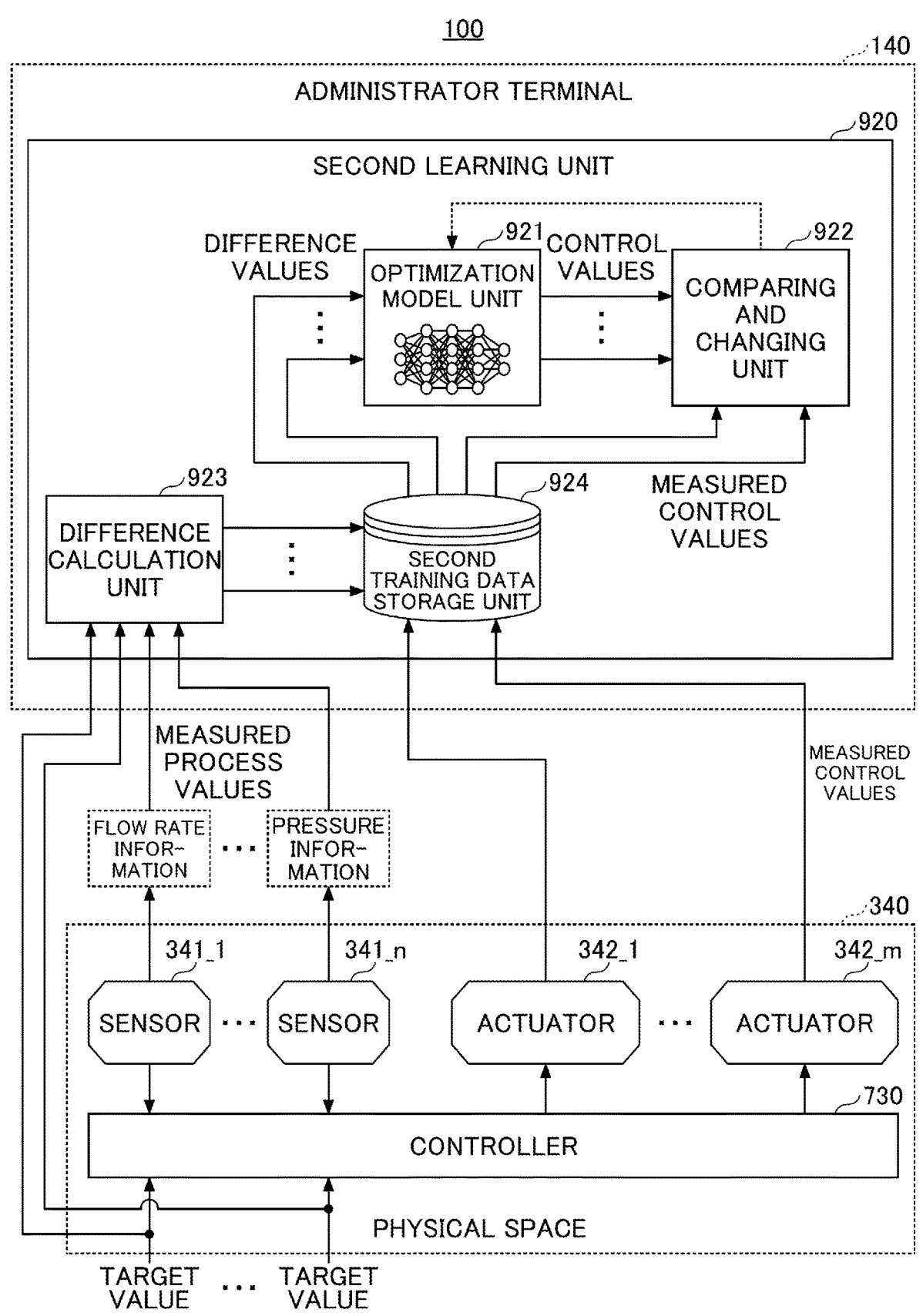
FIG. 9 is a second diagram illustrating an example of a functional configuration of the cyber-physical system with respect to the learning phase.

Next, a functional configuration of the cyber-physical system 100 in the learning phase in which a learning process is performed with respect to the optimization model unit will be described. FIG. 9 is a second diagram illustrating an example of the functional configuration of the cyber-physical system in the learning phase.

A second learning program is installed in the administrator terminal 140, and the administrator terminal 140 functions as a second learning unit 920 by executing the second learning program.

The second learning unit 920 stores second training data in a second training data storage unit 924. Specifically, the second learning unit 920 acquires the difference values of the time T+ΔT calculated by a difference calculation unit 923 and multivariate measured control values of the time T provided from the physical space 340. The difference calculation unit 923 calculates the respective difference values using measured process values provided from the physical space 340 and target values of time T+ΔT acquired via the management apparatuses 120_1 to 120_n (not illustrated in FIG. 9).

The example of FIG. 9 illustrates that, in the physical space 340, the substrate processing apparatuses 130_1 to 130_$n$ include the control targets (sensors 341_1 to 341_$n$ and actuators 342_1 to 342_$m$) and the controllers 730 that control the control targets.

The controller 730 controls the actuators 342_1 to 342_$m$ in such a manner that multivariate measured process values measured by the sensors 341_1 to 341_$n$ approach multivariate target values set in the controller 730.

The difference calculation unit 923 acquires multivariate target values of the current time and multivariate measured process values of the time T+$\Delta$T, and calculates respective difference values of time T+$\Delta$T. In addition, the second learning unit 920 acquires multivariate measured control values of the current time T, generates second training data by associating the acquired measured control values with the respective difference values of the time T+$\Delta$T calculated by the difference calculation unit 923 and using these values, and stores the second training data in the second training data storage unit 924.

The second learning unit 920 includes an optimization model unit 921 and a comparing and changing unit 922, and performs a learning process with respect to the optimization model unit 921.

Specifically, the second learning unit 920 reads the second training data from the second training data storage unit 924, and inputs the respective difference values of the time T+$\Delta$T to the optimization model unit 921. As a result, the optimization model unit 921 outputs the multivariate control values of the time T.

In addition, the second learning unit 920 inputs the multivariate measured control values of the time T to the comparing and changing unit 922 as the ground truth data. Thus, the comparing and changing unit 922 calculates respective errors between the multivariate control values at the time T and the multivariate measured control values at the time T, and back-propagates these errors to update model parameters of the optimization model unit 921. Thus, the second learning unit 920 can learn input-output relationships between the difference values at the time T+$\Delta$T and the control values at the time T, and can generate the trained optimization model unit 333.

(4-2) Second Learning Process

Next, a flow of the second learning process executed by the cyber-physical system 100 in the learning phase will be described. FIG. 10 is an example of a flowchart illustrating the flow of the second learning process.

In step S1001, in the physical space 340, the controllers 730 in the substrate processing apparatuses 130_1 to 130_$n$ start control processes on the control targets.

In step S1002, the second learning unit 920 of the administrator terminal 140 acquires multivariate target values provided from the physical space 340. In addition, the second learning unit 920 of the administrator terminal 140 acquires multivariate measured process values of time T+$\Delta$T provided from the physical space 340.

In step S1003, the second learning unit 920 of the administrator terminal 140 calculates respective difference values between the multivariate target values and the multivariate measured process values of time T+$\Delta$T.

In step S1004, the second learning unit 920 of the administrator terminal 140 acquires multivariate measured control values of the time T provided from the physical space 340.

In step S1005, the second learning unit 920 of the administrator terminal 140 associates the calculated difference values of the time T+$\Delta$T with the acquired multivariate measured control values of the time T, to generate second training data.

In step S1006, the second learning unit 920 of the administrator terminal 140 performs a learning process with respect to the optimization model unit 921 using the generated second training data.

In step S1007, the second learning unit 920 of the administrator terminal 140 determines whether or not the learning process with respect to the optimization model unit 921 has been completed. When it is determined in step S1007 that the learning process has not been completed (NO in step S1007), the process returns to step S1002.

On the other hand, when it is determined in step S1007 that the learning process has been completed (YES in step S1007), the process proceeds to step S1008.

In step S1008, the second learning unit 920 of the administrator terminal 140 outputs the trained optimization model unit.

<Summary>

As can be seen from the above description, the management apparatus according to the first embodiment includes:

a prediction model unit, with respect to which an input-output relationship between multivariate measured control values at time T with respect to a control target and multivariate measured process values at time T+$\Delta$T with respect to the control target has been learned; and an optimization model unit configured to seek multivariate control values of the time T that minimize respective difference values between multivariate process values at the time T+$\Delta$T output from the prediction model unit and corresponding target values, and control the control target using the multivariate control values of the time T that have been sought and are optimal.

The prediction model unit is configured to, in response to a request from an agent unit, predict multivariate process values to be acquired after an elapse of a time $\Delta$T with respect to the control target in a case where the control target is controlled by designated control values of the time T, and output the multivariate process values that have been predicted to the agent unit.

Thus, according to the management apparatus of the first embodiment, since the prediction model unit is provided, it is possible to accurately predict a change in a process value with respect to the control target. The management apparatus according to the first embodiment is configured to calculate an optimal control value based on the predicted process value, and thus, the predicted process value can be used for a control process with respect to the control target. Furthermore, according to the management apparatus of the first embodiment, it is possible to predict a predicted process value in response to a request from an agent unit and output the predicted process value to the agent unit, so that the predicted process value can be used for appropriately responding to an event occurring in a physical space.

That is, according to the first embodiment, it is possible to provide a mechanism of predicting a change in a process value with respect to a control target and effectively using a prediction result.

Second Embodiment

In the first embodiment, the management apparatuses 120_1 to 120_$n$ are configured as separate management apparatuses, but the management apparatuses 120_1 to 120_$n$ may be configured as an integrated single apparatus. In this case, n management apparatuses may be configured to operate virtually (that is, as virtual machines) on a single apparatus.

In addition, in the first embodiment, each of the management apparatuses 120_1 to 120_n corresponding to the substrate processing apparatuses 130_1 to 130_n respectively has been described as executing the prediction program. However, a management apparatus (for example, the management apparatus 120_1) corresponding to one substrate processing apparatus (for example, the substrate processing apparatus 130_1) may be configured by, for example, a plurality of computers. By installing the prediction program in each of the plurality of computers, the prediction program may be executed in a form of distributed computing.

In addition, in the first embodiment, as an example of a method of installing the prediction program in the auxiliary storage device 203 of each of the management apparatuses 120_1 to 120_n, a method of downloading and installing the prediction program via the network has been described. In this regard, although the download source has not been particularly mentioned, when the prediction program is installed by such a method, the download source may be, for example, a server apparatus in which the prediction program is accessibly stored. In addition, the server apparatus may be an apparatus on a cloud that receives access from each of the management apparatuses 120_1 to 120_n via a network, and actual downloading of the prediction program may be permitted on a user change condition. That is, the server apparatus may be an apparatus on a cloud that provides a service of providing the prediction program.

In the first embodiment described above, the cyberspace is created in a management system including the plurality of management apparatuses 120_1 to 120_n. However, the cyberspace may be created in a place other than the management system. For example, the cyberspace may be created in the server apparatuses 110_1 to 110_3.

In the first embodiment, the first learning process and the second learning process are executed in the administrator terminal 140. However, the first learning process and the second learning process may be executed in the management apparatuses 120_1 to 120_n or the server apparatuses 110_1 to 110_3.

That is, the functions operated in each phase of the control phase, the simulation phase, and the learning phase may be implemented in separate apparatuses or may be implemented in an integrated apparatus.

Although the control process and the simulation process are executed in the different phases according to the first embodiment, the control process and the simulation process may be executed in parallel in the same phase.

In addition, with regard to the first embodiment, output destinations of the prediction model unit in which the learning process has been completed and the optimization model unit in which the learning process has been completed have not been mentioned, but the prediction model unit in which the learning process has been completed and the optimization model unit in which the learning process has been completed may be output to the management apparatuses 120_1 to 120_n. Alternatively, the prediction model unit in which the learning process has been completed and the optimization model unit in which the learning process has been completed may be registered in the server apparatuses 110_1 to 110_n in such a manner that the prediction model unit in which the learning process has been completed and the optimization model unit in which the learning process has been completed are downloadable.

Although details of the models have not been mentioned with respect to the first embodiment, each of the models used in the first embodiment may be, for example, a machine learning model using deep learning, and may be, for example, any one of:

a recurrent neural network (RNN);

a long short-term memory (LSTM);

a convolutional neural network (CNN);

a region based convolutional neural network (R-CNN);

YOLO (You Only Look Once);

a single shot multibox detector (SSD);

a generative adversarial network (GAN);

a support vector machine (SVM);

a decision tree;

a random forest; or the like.

Alternatively, a model using a genetic algorithm such as a genetic algorithm (GA) or genetic programming (GP) may be used, or a model trained by reinforcement learning may be used.

Alternatively, each of the models used in the first embodiment may be a model acquired by general statistical analysis other than deep learning, such as principal component regression (PCR), partial least squares (PLS), LASSO, ridge regression, linear polynomial, autoregressive model, moving average model, autoregressive moving average model, or an ARX model. Alternatively, any combination of the above models may be used.

It should be noted that the present invention is not limited to the configurations described herein, and thus, for example, it is possible to combine any of the configurations described in the above embodiments with other elements. Thus, the configurations described herein can be changed within a range not departing from the scope of the present invention, and a specific configuration can be appropriately determined according to a mode to which the present invention is applied.

The present application is based upon and claims the benefit of priority from Japanese Patent Application No. 2020-218532 filed on Dec. 28, 2020, the entire contents of which are incorporated herein by reference.

DESCRIPTION OF SYMBOLS

100: cyber-physical system

120_1 to 120_n: management apparatuses

130_1 to 130_n: substrate processing apparatuses

140: administrator terminal

310: cyberspace

320: agent unit

330: model prediction control unit

340: physical space

720: first learning unit

920: second learning unit

The invention claimed is:

1. A management apparatus comprising:

a processor configured to:

learn, with respect to a prediction model, an input-output relationship between multivariate control values at a time T with respect to a control target in a physical space and multivariate process values at a time $T+\Delta T$ with respect to the control target;

using an optimization model, seek multivariate control values of the time T that minimize respective differences between the multivariate process values at the time $T+\Delta T$ output from the prediction model and corresponding target values, and control the control target using the multivariate control values of the time T that have been sought; and in response to a request from an agent which determines the multivariate control values need to be changed due to an event occurring in the physical space, using the prediction model, predict multivariate process values of a time after an elapse of a time ΔT with respect to the control target in a case where the control target is controlled with designated control values, and output the multivariate process values that have been predicted to the agent, the agent responding to the event occurring in the physical space based on the multivariate process values that have been predicted.

2. The management apparatus as claimed in claim 1, wherein the processor is further configured to perform a learning process with respect to the prediction model and cause multivariate outputs acquired in response to multivariate measured control values of the time T being input to approach multivariate measured process values of the time T+ΔT with respect to the control target.

3. The management apparatus as claimed in claim 1, wherein the processor is further configured to perform a learning process with respect to the optimization model and cause multivariate control values at the time T output in response to respective differences between multivariate measured process values at the time T+ΔT and corresponding target values with respect to the control target being input to approach multivariate measured control values of the time T measured when the control target is controlled.

4. A prediction method comprising:

executing a prediction model unit, with respect to which an input-output relationship between multivariate control values at a time T with respect to a control target in a physical space and multivariate process values at a time T+ΔT with respect to the control target has been learned; and executing an optimization model unit of seeking multivariate control values of the time T that minimize respective differences between the multivariate process values at the time T+ΔT output from the prediction model unit and corresponding target values, and controlling the control target using the multivariate control values of the time T that have been sought, wherein the executing the prediction model unit includes, in response to a request from an agent which determines the multivariate control values need to be changed due to an event occurring in the physical space, predicting multivariate process values of a time after an elapse of a time ΔT with respect to the control target in a case where the control target is controlled with designated control values, and outputting the multivariate process values that have been predicted to the agent, the agent responding to the event occurring in the physical space based on the multivariate process values that have been predicted.

5. A non-transitory computer readable recording medium storing a prediction program causing a computer to perform:

executing a prediction model unit, with respect to which an input-output relationship between multivariate control values at a time T with respect to a control target in a physical space and multivariate process values at a time T+ΔT with respect to the control target has been learned; and executing an optimization model unit of seeking multivariate control values of the time T that minimize respective differences between the multivariate process values at the time T+ΔT output from the prediction model unit and corresponding target values, and controlling the control target using the multivariate control values of the time T that have been sought, wherein the executing the prediction model unit includes, in response to a request from an agent which determines the multivariate control values need to be changed due to an event occurring in the physical space, predicting multivariate process values of a time after an elapse of a time ΔT with respect to the control target in a case where the control target is controlled with designated control values, and outputting the multivariate process values that have been predicted to the agent, the agent responding to the event occurring in the physical space based on the multivariate process values that have been predicted.

6. The management apparatus as claimed in claim 1, wherein the processor is further configured to determine whether or not new target values have been set by the agent, in response to determining that the new target values have been set by the agent, seek optimal multivariate control values that minimize respective differences between the multivariate process values and the new target values, transmit the optimal multivariate control values to the control target, and thereafter acquire multivariate measured process values from the physical space, and in response to determining that the new target values have not been set by the agent, acquire the multivariate measured process values from the physical space without seeking the optimal multivariate control values.

\* \* \* \* \*